UNITED STATES PATENT OFFICE.

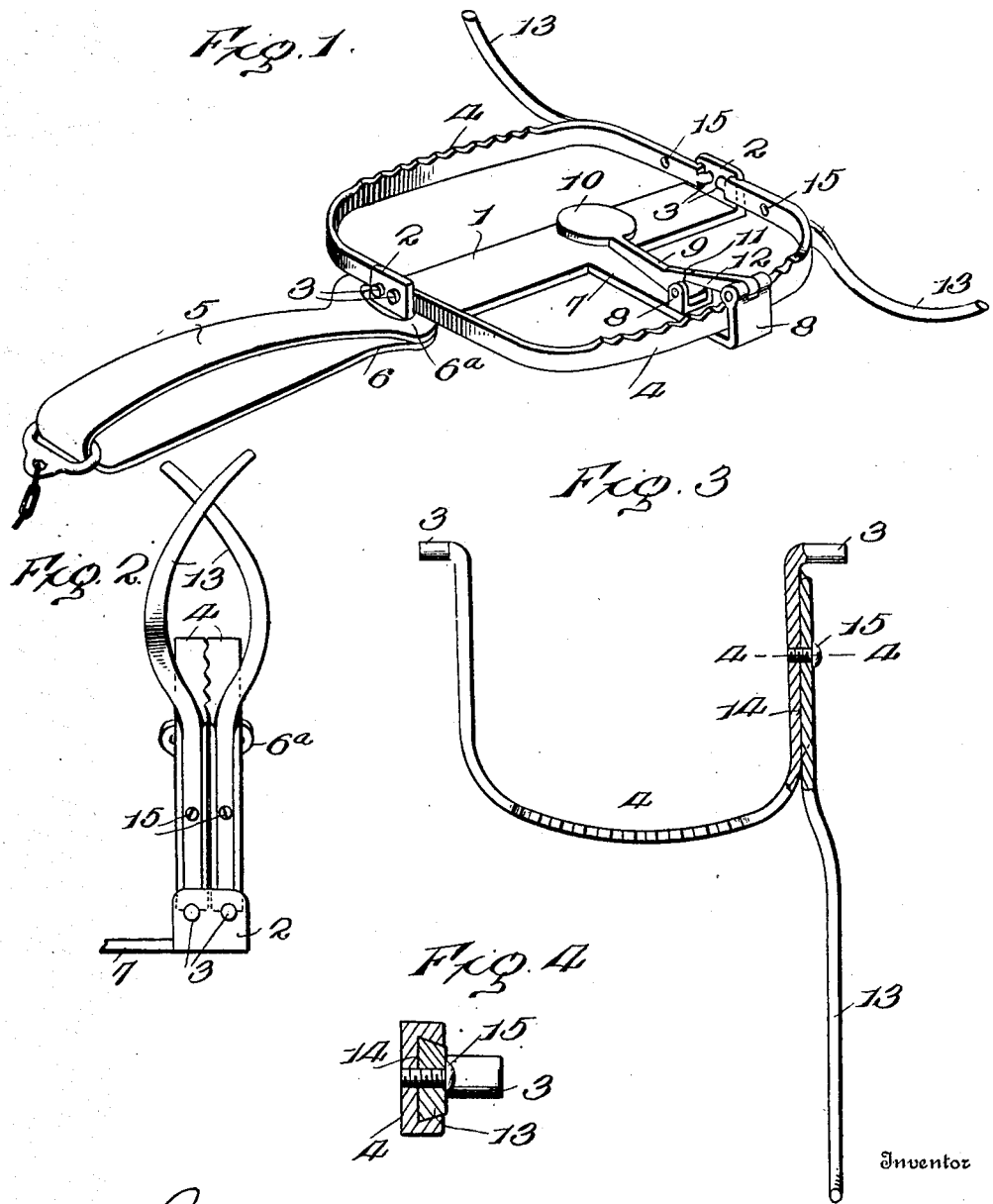

THOMAS BOOTH, OF BOISE, IDAHO.

ANIMAL-TRAP.

No. 925,746.     Specification of Letters Patent.     Patented June 22, 1909.

Application filed November 24, 1908. Serial No. 464,205.

*To all whom it may concern:*

Be it known that I, THOMAS BOOTH, citizen of the United States, residing at Boise city, in the county of Ada and State of Idaho, have invented certain new and useful Improvements in Animal-Traps, of which the following is a specification.

This invention comprehends certain new and useful improvements in traps of that type embodying steel jaws adapted to be closed together by a spring to engage the leg or some other member of an animal meddling with the bait, and the invention has for its object a simple, durable and efficient construction of device of this character which embodies peculiar means for engaging the body of an animal above the jaws, so as to prevent an animal having its foot caught between the jaws, escaping from the trap by gnawing off its foot or other member, the trap being adapted for use in capturing animals generally, although it is particularly designed for use in trapping rats and similar pests.

With this and other objects in view that will more fully appear as the description proceeds, the invention consists in certain constructions and arrangements of the parts that I shall hereinafter fully describe, and then point out the novel features thereof in the appended claim.

For a full understanding of the invention and the merits thereof, and to acquire a knowledge of the details of construction, reference is to be had to the following description and accompanying drawing, in which:

Figure 1 is a perspective view of a trap equipped with the improvements of my invention; Fig. 2 is an end elevation thereof; Fig. 3 is a detail view, partly in section, of one of the jaws and an arm carried thereby; and, Fig. 4 is an enlarged section on the line 4—4 of Fig. 3.

Corresponding and like parts are referred to in the following description and indicated in all the views of the drawing by the same reference characters.

A trap to which my invention is applied, consists essentially in a base 1 that is provided at its opposite ends with suitable bearings 2 in which are rotatably mounted pintles 3 formed at the extremities of laterally swinging preferably steel jaws 4. These jaws are designed to be normally held together by means of a spring 5 which, in the present instance, is substantially V-shaped and is formed at its extremities with eyes 6 and 6ª, the eye 6 encircling one of the bearings 2, and the eye 6ª encircling the corresponding ends of the jaws 4 to support the same in substantially upright or closed position. This spring is adapted to be compressed so as to slip the eye 6ª downwardly off of the ends of the jaws and around the adjacent bearing, and the jaws are designed to be swung apart against the tension of the spring, and to be maintained in such position by any suitable means so as to set the trap. This engaging means preferably embodies a cross bar 7 which is secured to the base 1 at an intermediate point thereof, and which has one end projecting laterally beyond the cross bar and formed with upwardly disposed transversely spaced standards 8.

A bait lever 9 is fulcrumed at one end upon the inner standard, and is disposed transversely and formed at its other or free end with a pan 10 which is normally arranged above the cross bar 7 and is designed to carry suitable bait. Near its pivoted end, the bait lever 9 is formed with an upwardly disposed outwardly facing hooked lug 11 arranged to engage the free or swinging end of a trigger 12 which is fulcrumed at its other end on the outer standard 8 and which is arranged to extend across one of the jaws 4, as shown, to maintain the same in an open position against the tension of the spring 5, the jaw being retained in such position by the trigger until the pan 10 is depressed by an animal meddling with the bait, whereupon the hooked lug 11 is disengaged from the trigger and the latter releases the jaw, permitting the spring 5 to act upon both of the jaws to close the same forcibly and engage the leg or some other part of the animal. It is to be understood that the elements just described form no part, in themselves, of the present invention, and hence may be of any desired construction or design.

The other ends of the jaws, that is the ends opposite to the spring 5, carry arms 13 which project radially outwardly beyond the jaws, and which are curved so as to be crossed beyond the jaws when the same are closed, as best seen in Fig. 2. These arms may be rigidly secured to the jaws in any suitable manner, although in the present instance, the ends of the jaws are formed in their outer surfaces with grooves 14 having undercut walls, and the arms have beveled edges adapted to be slipped into engagement with the undercut walls of the grooves and to be detachably secured therein by means of set screws 15 or other suitable fastening means.

In the practical use of an animal trap equipped with the improvements of my invention, it will be seen that when the jaws are spread apart in open position when the trap is set, the arms secured to the respective jaws will be deposed in substantially the same plane as the same, so as to be out of the way and not interfere with the action of an animal attempting to obtain the bait. Should this animal, in its endeavors to procure the bait, step upon the pan 10, or otherwise depress the bait lever 9, it is manifest that the jaws 4 will be released so as to clutch the leg or other member therebetween, in the usual manner. Furthermore, since the arms are rigidly connected to the jaws and project outwardly beyond the same, the scope of the trap is materially increased and the arms will embrace the body of the animal when the trap is sprung, thereby precluding any possibility of the animal effecting an escape by gnawing off its foot or other member clutched between the jaws. These arms 13 will also serve as a precautionary measure to prevent the possibility of the animal not being caught when the trap is sprung, since, even if it succeeded in dodging the jaws, it would be captured by the arms.

From the foregoing description, in connection with the accompanying drawing, it will be apparent that I have provided an improved trap which is considerably more efficient in operation than the usual traps of this character, which is simple and durable in construction, and which may be placed upon the market at a price substantially equal to the price of the ordinary traps, since the addition of the arms involves very little expense.

In some instances, such as when the invention is embodied in small-sized traps, it has been found desirable to form the corresponding jaws 4 and arms 13 from single castings, or otherwise make such parts of integral structure.

Having thus described the invention, what I claim is:

In an animal trap, the combination of a base, substantially U-shaped jaws pivotally connected at their extremities to the base, the jaws being formed at corresponding ends with longitudinal grooves having undercut walls, arms situated in the respective grooves and having beveled edges to engage the undercut walls thereof, the arms projecting outwardly beyond the jaws to grip the body of an animal, and fastening means mounted in the arms and the jaws to rigidly and detachably secure the former to the latter.

In testimony whereof I affix my signature in presence of two witnesses.

THOMAS BOOTH. [L. S.]

Witnesses:
   CHAS. PATTERSON,
   F. J. GARVER.